United States Patent Office 2,815,079
Patented Dec. 3, 1957

2,815,079

METHOD OF AND COMPOSITION FOR RECOVERING CIRCULATION OF DRILLING FLUIDS IN WELLS

William C. Goins, Jr., and Fred Nash, Jr., Bellaire, Tex., assignors to Gulf Oil Corporation, Pittsburgh, Pa., a corporation of Pennsylvania Application June 29, 1954, Serial No. 440,072

9 Claims. (Cl. 166—29)

This invention relates to a method and means for preventing lost circulation of well-drilling fluids and has reference more particularly to an improved sealing material for stopping the loss of drilling fluids through formation openings during the drilling of boreholes.

In the rotary drilling of petroleum wells drilling fluids are employed which are usually composed of water, clay and, for example, barites and treating chemicals. During the drilling operation, the drilling fluid is circulated down the drill pipe, through holes in the bit, and back through the annular space between the drill pipe and the borehole to the surface. The fluid serves a number of purposes, among which are the cooling and lubrication of the pipe and bit, the flushing out of bit cuttings and the plastering of the borehole wall under a hydrostatic pressure created by the column of fluid, which plastering prevents the sloughing of loose formations and the flowing of formation fluids into the borehole. The continued circulation of the drilling fluid is, therefore, essential to the progress of the drilling operation.

It is a common experience in drilling to encounter losses of the drilling fluid through openings in the formation which may be either natural fissures, porous formations, or fissures created by well pressures. Openings which cause lost circulation must be sealed before circulation of drilling fluid can be reestablished and drilling resumed. Several methods and numerous materials have been used, therefore, to regain full circulation but no methods have been found that are successful in all cases. Most of these materials are fibrous or granular particles and are mixed with the drilling fluid in an attempt to seal off the zone of loss.

Briefly stated, our invention comprises an improved sealing material for stopping lost circulation of drilling fluids, which material consists essentially of a mixture of pre-sized hard granular particles selected from the group consisting of nut shells, synthetic resins, hard wood, and resin-impregnated wood, the said particles being compounded so that their size distribution will be substantially as follows: between 2 and 9 cumulative percent by weight retained on a screen of an opening that is 90 percent of the maximum particle size; between 12 and 28 cumulative percent by weight retained on a screen of an opening that is 70 percent of the maximum particle size; between 27 and 46 cumulative percent by weight retained on a screen of an opening that is 50 percent of the maximum particle size; between 54 and 75 cumulative percent by weight retained on a screen of an opening that is 20 percent of the maximum particle size; between 67 and 88 cumulative percent by weight retained on a screen of an opening that is 10 percent of the maximum particle size; and between 78 and 94 cumulative percent by weight retained on a screen of an opening that is 5 percent of the maximum particle size. The largest size particles will have a minimum size of at least about 1/4 inch and preferably 3/8 inch in any one dimension. The cumulative weight percent retained on a particular screen is obtained by adding the percent of the weight of the sample retained on that screen to the percent of the weight of the sample retained on screens having larger openings.

More specifically, a preferred range of size distribution falling within the above defined range of invention is indicated by the following table:

TABLE I

| Percent of Maximum Particle Size | Cumulative Weight Percent Retained |
|---|---|
| 90 | between 2 and 9. |
| 80 | between 7 and 17. |
| 70 | between 12 and 28. |
| 60 | between 20 and 37. |
| 50 | between 27 and 46. |
| 40 | between 34 and 56. |
| 30 | between 43 and 64. |
| 20 | between 54 and 75. |
| 10 | between 67 and 88. |
| 5 | between 78 and 94. |
| 1 | between 95 and 100. |

The invention comprises also an improved sealing composition that consists essentially of a drilling fluid or mud containing a weighting agent and a liquid medium, and between 3 and 50 and preferably between 3 and 20 pounds, per barrel of drilling fluid, of a mixture of pre-sized hard granular particles selected from the group consisting of nut shells, synthetic resins, hard wood and resin-impregnated wood, having a size distribution substantially as defined above.

The invention further comprehends an improved method of preparing sealing material and preventing and curing lost circulation, according to which method a hard particulate or granular solid, which can be either nut shells, a synthetic resin, a hard wood, or a resin-impregnated wood is screened into its various particle sizes, and is thereafter mixed in predetermined proportions so as to provide a material of the hereinbefore defined size distribution (a screen analysis of a sample of the selected comminuted material can be made and if the comminuted material is not too far removed from the proper size distribution, portions of various screened sizes can be added to the mass of material to formulate the proper size distribution). The so-prepared sealing material is then mixed with drilling fluid containing a clay and a liquid medium, usually water, the amount of sealing material being between about 3 and 50 and preferably between 3 and 20 pounds per barrel of drilling fluid. The mixture constituting the sealing composition is pumped into the well bore through the open-ended drill string, the end of the string having been set so as to direct the composition to the point of loss of circulation or fracture of the formation. It is preferred to squeeze the composition into the fracture by applying pump pressure on the fluids in the borehole against closed blow-out preventors. Our method also includes the step of adjusting the density of the drilling fluid employed in compounding our sealing composition, by adding weighting or thinner materials, so as to form a medium in which our sealing material will form a suitably stable suspension.

The materials above mentioned which are useful as a sealing material in the present composition and in our improved method of preventing or recovering lost circulation and regaining full returns constitute a class of materials that have sufficient strength to resist the high pressures existing in wells, have a specific gravity sufficiently close to that of the drilling fluid to minimize gravity separation of the particles, and, while hard with respect to other materials of the drilling fluid and the formation, are not abrasive to drill pipes and the like through which the material is pumped. Of the aforementioned materials, crushed nut shells and preferably walnut and hickory shells are especially suitable.

Walnut shells, for example, of the above defined size distribution were employed in drilling fluid to seal openings and they were found to seal substantially larger openings, than did other materials which were either of smaller size, softer composition or which did not exhibit the uniform and premixed size distribution of the applicants' material.

Particles of synthetic resin can be conveniently formed within the desired size range and have compressive strengths between about 20,000 and 30,000 pounds per square inch, such resins being thus well adapted to the present purposes. The specific gravity of many plastics being high they are well suited to maintaining dispersions in drilling fluids. These resins can include particles of hard rubber.

Of the various hard woods that can be employed, e. g., hickory, oak or mahogany, the denser hard woods, are preferred. The hardness and density of wood particles can be increased by impregnating the wood, preferably after comminuting it, with a synthetic resin. In this way the density of the drilling fluid can be substantially duplicated in the impregnated wood.

A preferred range which includes optimum size distributions for the selected materials is defined by the curves in the attached drawings and is as follows: a maximum size that will just pass a ½ inch screen opening; between 5 and 20 cumulative percent by weight retained on a screen of 0.4 inch opening; between 35 and 55 cumulative percent by weight retained on a screen of 0.2 inch opening; between 54 and 75 cumulative percent by weight retained on a screen of 0.1 inch opening; between 67 and 90 cumulative percent by weight retained on a screen of 0.05 inch opening; between 80 and 95 cumulative percent by weight retained on a screen of 0.02 inch opening; between 88 and 97 cumulative percent by weight retained on a screen of 0.01 inch opening; and between 95 and 100 cumulative percent by weight retained on a screen of 0.005 inch opening.

In the accompanying drawings supplied for the purpose of illustrating the present invention, Fig. 1 is a chart illustrating the size distribution of the particles employed in our method of recovering circulation and constituting our sealing composition, plotted cumulatively on a semi-logarithmic scale such as is customarily employed in showing particle size distribution;

Figure 1:
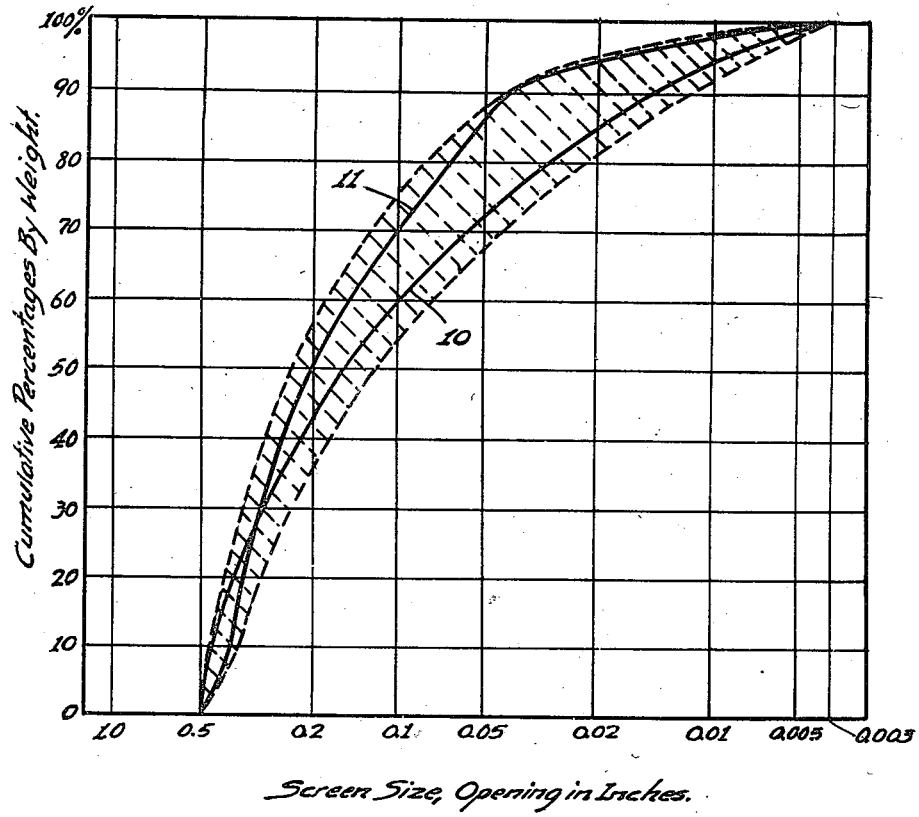

Referring now to Fig. 1, the cross-hatched area on the chart illustrates approximately a preferred range of size distribution of particles employed in the method of our invention and constituting our sealing material. Curves 10 and 11 illustrative examples of ground walnut shells having a pre-determined composited size distribution. It is observed that the hatch-marked area is fairly narrow and that the curves 10 and 11 falling within this area define samples having that particle size distribution which will provide improved results in stopping lost circulation when employed in concentrations of between about 3 and 25 pounds per barrel of drilling fluid.

Figure 2:
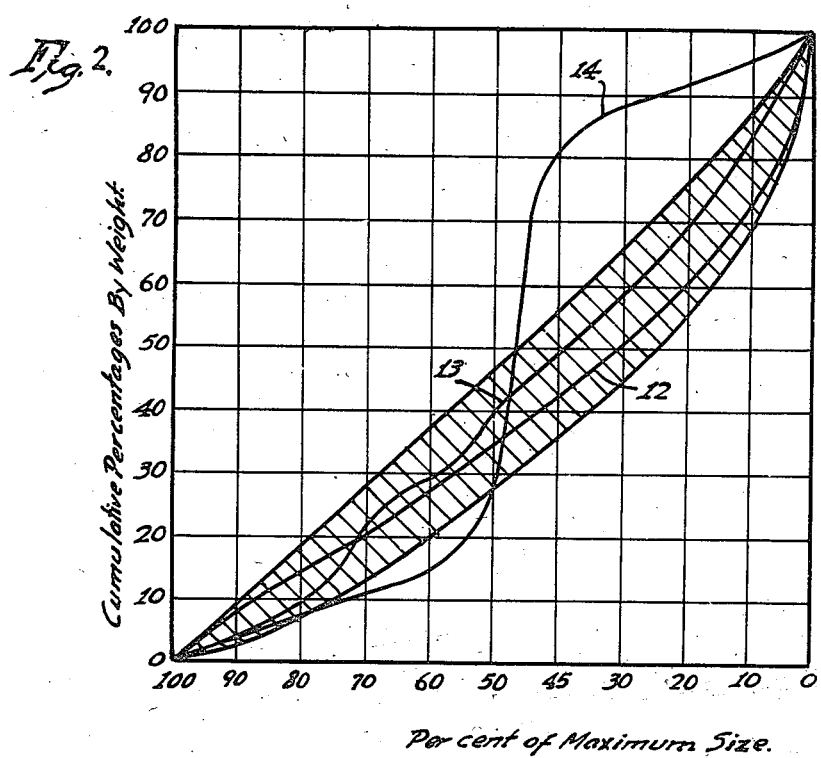
Fig. 2 is a chart showing relative size distribution of the particles.

Fig. 2 illustrates the relative size distribution of the particles which constitute an essential part of our sealing composition and is applicable to any distribution falling within the range and having a maximum size at least greater than ½ inch. The maximum particle size is expressed as that screen size through which all of the material will just pass. In plotting Fig. 2 the sizes of the various screened portions of particles of sealing material are indicated as percentages of the maximum particle size.

For example, if the maximum particle size is ½ inch and the particle size considered is ¼ inch the percentage of maximum size will be 50 percent. This percentage of maximum size is plotted against the cumulative percentage by weight retained on each screen employed in the analysis. It was found that the particle-size distribution effecting improved results in our composition falls within the indicated cross-hatched area on Fig. 2. Curves 12 and 13 of this figure correspond respectively to the samples and size distributions shown by curves 10 and 11 in Fig. 1. Such size distribution is not the natural result of crushing, but is a product of recombining sizes. A product having a size distribution not conforming to the distribution of our product is shown by curve 14. This material showed poor results in evaluation for recovery of circulation.

Numerous materials having size distributions falling outside of the cross-hatched areas of Figures 1 and 2 were found, upon testing as hereinafter described, to fail in sealing the larger-size openings even though all of these had particles of the same maximum size. Those falling at certain points within the areas but not remaining within the areas for all weight fractions required excessive and uneconomic proportions in drilling fluid to seal effectively the larger-size openings.

Our method and composition for stopping lost circulation in wells can best be demonstrated by laboratory apparatus since of course neither openings in the formations nor the sealing of them can be directly observed. Therefore, apparatus, hereinafter briefly described, has been devised to demonstrate numerically the superior behavior of our composition and its improved results. Sealing compositions containing walnut shells having the size distributions shown in Figures 1 and 2 were tested in the apparatus.

The test apparatus consisted primarily of a section of 2½ inch extra heavy pipe to one end of which a large nitrogen bottle with regulator, hose, needle valve, bleeder, etc. is attached and to the other end of which is connected a replaceable brass plug containing slots of known length and width. Several brass plugs containing slots ranging, in 0.020 inch increments, from 0.020 to 1.020 inches in width are employed with the apparatus.

In performing the test a drilling fluid containing some bentonite and barite is mixed and allowed to hydrate. After hydration numerous mixtures of the drilling fluid and different concentrations, e. g., 3, 5, 10, 15, 20, 25 and 30 pounds per barrel, of crushed walnut shells are mixed and from these samples there is determined the maximum slot that can be sealed for each concentration. The samples are each introduced into the high pressure pipe and pressures up to 1000 pounds per square inch are impressed on the mixture of drilling fluid and filler. Observations are made as to the pressures required to break the seal and force drilling fluids through the slot in the brass plug and of the maximum sized openings which can be sealed up to 1000 pounds per square inch by drilling fluids containing fillers of various concentrations.

Figure 3:
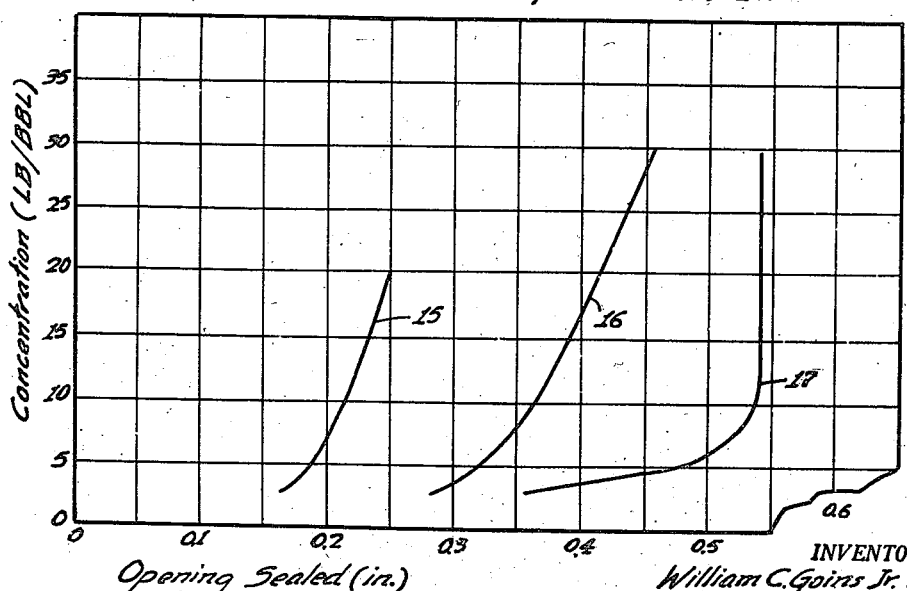
Fig. 3 is a chart illustrating the improved test results obtained by employing our improved composition in sealing openings of indicated size.

Fig. 3 illustrates the improved results obtained when employing our sealing composition. This composition is compared with other sealing compositions with unsatisfactory size distribution, although all contained some of the same maximum size particles as that of our composition. These other sealing compositions exhibited resultant poor performance. Curve 15 shows the average performance of two commercially available filler materials having an unsatisfactory size distribution. Curve 16 shows the average performance of three different sealing compositions composed of crushed nut shells suspended in drilling fluid which have either a random size distribution obtained by crushing the shells and directly adding them to the drilling fluid or a size distribution outside the range prescribed for our filler particles. Curve 17 represents the results obtained when employing our sealing composition, the curve representing two series of runs with different concentrations of crushed walnut shells of two different size distributions within our disclosed range.

It can be seen from the curves 15, 16 and 17 of Fig. 3 that variations in the size distribution of the filler particles effect substantial differences in the ability of the sealing compositions containing the fillers to seal openings in formations. For example, curve 16 shows that a drilling fluid containing material which did not conform to the size distribution of the invention would seal openings in formations up to those of only about 0.35 inches in width. The larger sized openings, those of 0.5 inches and greater, required, in the instances where the openings could be sealed at all, excessively high concentrations of filler material of the other size distributions. It was in fact found that one sample of drilling fluid containing random sized particles would seal openings of as great a width as that of the composition of invention, but three times the weight of filler material was required to do this.

Curve 17 of Fig. 3 which shows substantially identical results obtained from two series of tests of our sealing composition containing from about 3 pounds of crushed walnut shells per barrel up to 30 pounds per barrel shows that increasing the concentration from 3 to 5 pounds per barrel rapidly increases the size of opening that can be sealed and that no apparent improvement is obtained after about 10 pounds per barrel was used.

In the introduction of our graded materials in drilling fluid into the borehole it will usually be found necessary first to remove the drill (unless the holes in the drill are large enough for passage of the largest particles of filler material) and to employ special conveying and pumping apparatus adapted to handling relatively large size filler material. It may be more convenient to maintain this equipment on service trucks and apply it to the surface apparatus of wells only when the well is being treated to correct a lost circulation problem. It was found that the quantity of drilling fluid containing filler material that is required to seal a formation can be substantially reduced by first determining the point of lost circulation in the borehole by such methods as that disclosed in the copending application of Martin and Wyckoff, Ser. No. 359,358, filed June 3, 1953, now Patent 2,773,236 December 4, 1956, and thereafter releasing the drilling fluid at or near the point of lost circulation. The general procedure for introducing fluid into the well to seal formation openings and apparatus for introducing the fluid is described in the copending application Ser. No. 255,442, filed November 8, 1951 of Goins and others, now abandoned.

Employment of our graded filling material in the successful correction of lost circulation and recovery of complete circulation in a well is described in the following specific example in which the foregoing laboratory findings are confirmed and the beneficial results obtainable only from our specially sized material are amply demonstrated.

In the drilling of a well with an 8½ inch diameter bit, a 9⅝ inch casing having been set at about 8900 feet, lost circulation first occurred in the well while drilling at about 9200 feet with a lime treated mud having a density of 16.1 pounds per gallon. Fine mica was added to the drilling mud and the circulation loss was temporarily halted. The drilling was then continued to a depth of 9400 feet when a loss of circulation again occurred. The drill was then pulled back into the casing and circulation was attempted at 250 pounds per square inch pump pressure. After a subsequent period of three hours, it was found that 100 percent circulation still could not be obtained.

Remedial measures were thereupon employed to stem the loss in circulation. The drilling string was withdrawn and the bit removed; the pipe was then run back open ended to about 9200 feet. The well was again tested but still did not show 100 percent circulation. A filler material comprising walnut hulls and having a size distribution outside of the range disclosed for our material was mixed with 120 barrels of drilling mud in the amount of 19.2 pounds of filler per barrel of mud. This suspension was pumped into the well until about 30 barrels had been displaced down the drill pipe and into the annular space and an additional 90 barrels were in the drill pipe. This placed the mud containing filler material above the casing seat. The blowout preventer was then closed and the suspension was slowly squeezed into the formation by pumping. A maximum pressure of only 10 pounds per square inch could be obtained during the squeezing operation even after 90 barrels of the suspension had been pumped into the formation. The drill pipe was then pulled to the casing and the well was allowed to set for six hours. The treatment did not restore circulation.

Crushed walnut hulls which had been screened and separated in various screen sizes and reconstituted to provide a material having a size distribution falling within the range of the present invention as shown, for example, by the crosshatched area of Fig. 1, were then mixed with 115 barrels of drilling mud in the proportion of 13 pounds of graded walnut shells per barrel of drilling mud. The suspension of walnut hulls in the drilling mud was stabilized by adding as a thickener of the mud approximately one pound of polyacrylonitrile for each 60 pounds of walnut shells. An 18 inch displacement pump, with screen removed, was employed to drive the drilling mud containing the filling material into the well. The suspension was displaced down the well until about 30 barrels of the material was in the annular space thus placing some of the material above the casing seat. This, in itself, restored 100 percent circulation but, to prevent a recurrence of the loss, a squeeze operation was employed. At the beginning of the squeeze the annular pressure rose with slow pumping to 350 p. s. i. and when the pump was shut off this fell to 320 p. s. i. With a drilling mud of 16.0 pounds per gallon density in the hole at the time, this placed the equivalent of a 16.7 pounds per gallon mud at the point of loss. After a wait of a few minutes, slow pumping at about 8 strokes per minute was resumed and for a short period of about 5 minutes the well took mud at 320 p. s. i., at which time our hull suspension sealed the formation and the pressure then climbed rapidly to 515 p. s. i. The pressure bled to 500 p. s. i. and then held steady. When pumping was resumed the pressure built rapidly to 580 p. s. i. and held, with no bleed off. This pressure, added to hydrostatic pressure, gave the equivalent of a mud of 17.2 pounds per gallon density. The total amount of the sealing composition, containing our walnut-hull sealing material, displaced into the formation was 10 barrels. The pipe was then pulled to the casing, 250 p. s. i. pressure was reimposed and the well was allowed to set for 3 hours. The hole was then circulated in stages to bottom. Drilling was resumed with no further loss of fluid at the sealed formation.

Our sealing composition which essentially contains the graded sealing material of hereindefined size will usually comprise water and a clay but the sealing material can also be mixed with a non-aqueous drilling fluid such as an oil-base mud. The composition can also comprise one or more fibrous filler materials.

Having described our invention, we claim:

1. A sealing material for addition to drilling fluids for preventing and curing lost circulation, the said material comprising hard granular particles selected from the group consisting of nut shells, synthetic resins, hard wood, and resin impregnated wood, containing particles of maximum size that are at least about ¼ inch in any one dimension, and having a compounded size distribution such that between 2 and 9 cumulative percent by weight is retained on a screen of an opening that is 90 percent of the maximum particle size, between 12 and 28 cumulative percent by weight is retained on a screen of an opening that is 70 percent of the maximum particle size, between 27 and 46 cumulative percent by weight is retained on a screen of an opening that is 50 percent of the maximum particle size, between 54 and 75 cumulative percent by weight is retained on a screen of an opening that is 20 percent of the maximum particle size, between 67 and 88 cumulative percent by weight is retained on a screen of an opening that is 10 percent of the maximum particle size, and between 78 and 94 cumulative percent by weight is retained on an opening that is 5 percent of the maximum particle size, said sealing material having been prepared by separating particles according to their size and then combining particles of different size in proportions to give a mixture having the particle size distribution defined herein.

2. The sealing material of claim 1 in which the selected hard granular particles consist of comminuted nut shells.

3. The material of claim 2 in which the selected hard granular particles consist of comminuted walnut shells.

4. A sealing material for addition to drilling fluids for preventing and curing lost circulation, the said material comprising hard granular particles selected from the group consisting of nut shells, synthetic resins, hard wood, and resin impregnated wood, containing particles of maximum size that will just pass through a screen of 0.5 inch opening, and having a compounded size distribution substantially as follows: between 5 and 20 cumulative percent by weight retained on a screen of 0.4 inch opening; between 35 and 55 cumulative percent by weight retained on a screen of 0.2 inch opening; between 54 and 75 cumulative percent by weight retained on a screen of 0.1 inch opening; between 67 and 90 cumulative percent by weight retained on a screen of 0.05 inch opening; between 80 and 95 cumulative percent by weight retained on a screen of 0.02 inch opening; between 88 and 97 cumulative percent by weight retained on a screen of 0.01 inch opening; and between 95 and 100 cumulative percent by weight retained on a screen of 0.005 inch opening, said sealing material having been prepared by separating particles according to their size and then combining particles of different size in proportions to give a mixture having the particle size distribution defined herein.

5. The sealing material of claim 4 in which the selected hard granular particles consist of comminuted nut shells.

6. The sealing material of claim 4 in which the selected hard granular particles consist of comminuted walnut shells.

7. A method of preparing a sealing material for restoring the circulation of well-drilling fluids lost through openings or fractures in formations through which the borehole of the well passes, the said method comprising: separating, according to size, particles of a hard granular material selected from the group consisting of nut shells, synthetic resins, hard wood, and resin impregnated wood; and mixing together predetermined proportions by weight of the separated particles of different size so as to obtain a composited mixture having a size distribution in which the particles of maximum size are at least about ¼ inch in any one dimension, between 2 and 9 cumulative percent by weight is retained on a screen of an opening that is 90 percent of the maximum particle size, between 12 and 28 cumulative percent by weight is retained on a screen of an opening that is 70 percent of the maximum particle size, between 27 and 46 cumulative percent by weight is retained on a screen of an opening that is 50 percent of the maximum particle size, between 54 and 75 cumulative percent by weight is retained on a screen of an opening that is 20 percent of the maximum particle size, between 67 and 88 cumulative percent by weight is retained on a screen of an opening that is 10 percent of the maximum particle size, and between 78 and 94 cumulative percent by weight is retained on an opening that is 5 percent of the maximum particle size.

8. A sealing composition consisting essentially of a drilling fluid containing a weighting agent, a liquid medium, and between 3 and 50 pounds, per barrel of drilling fluid, of pre-sized hard granular particles selected from the group consisting of nut shells, synthetic resins, hard wood and resin-impregnated wood, the selected particles having a maximum size of at least ¼ inch and a size distribution such that between 2 and 9 cumulative percent by weight is retained on a screen of an opening that is 90 percent of the maximum particle size; between 12 and 28 cumulative percent by weight is retained on a screen of an opening that is 70 percent of the maximum particle size; between 27 and 46 cumulative percent by weight is retained on a screen of an opening that is 50 percent of the maximum particle size; between 54 and 75 cumulative percent by weight is retained on a screen of an opening that is 20 percent of the maximum particle size; between 67 and 88 cumulative percent by weight is retained on a screen of an opening that is 10 percent of the maximum particle size; and between 78 and 94 cumulative percent by weight is retained on an opening that is 5 percent of the maximum particle size, said hard granular particles having been prepared by separating particles according to their size and then combining particles of different size in proportions to give a mixture having the particle size distribution defined herein.

9. A method of combating lost circulation of drilling fluid in wells by sealing openings or fractures in the penetrated formations, the said method comprising introducing into the borehole of a well and conducting by means of pressure applied thereto to the point of lost circulation a sealing composition consisting essentially of a drilling fluid containing a weighting agent and a liquid medium and between 3 and 50 pounds per barrel of drilling fluid of a mixture of pre-sized hard granular particles selected from the group consisting of nut shells, synthetic resins, hard wood and resin-impregnated wood, containing particles of maximum size that are at least about ¼ inch in any one dimension, and having a compounded size distribution such that between 2 and 9 cumulative percent by weight is retained on a screen of an opening that is 90 percent of the maximum particle size, between 12 and 28 cumulative percent by weight is retained on a screen of an opening that is 70 percent of the maximum particle size, between 27 and 46 cumulative percent by weight is retained on a screen of an opening that is 50 percent of the maximum particle size, between 54 and 75 cumulative percent by weight is retained on a screen of an opening that is 20 percent of the maximum particle size, between 67 and 88 cumulative percent by weight is retained on a screen of an opening that is 10 percent of the maximum particle size, and between 78 and 94 cumulative percent by weight is retained on an opening that is 5 percent of the maximum particle size, said hard granular particles having been prepared by separating particles according to their size and then combining particles of different size in proportions to give a mixture having the particle size distribution defined herein.

References Cited in the file of this patent
UNITED STATES PATENTS

| | | |
|---|---|---|
| 2,502,191 | Williams | Mar. 28, 1950 |
| 2,599,745 | Campbell et al. | June 10, 1952 |
| 2,650,195 | Cardwell et al. | Aug. 25, 1953 |
| 2,734,861 | Scott et al. | Feb. 14, 1956 |